United States Patent
Coupe et al.

(10) Patent No.: US 8,755,581 B2
(45) Date of Patent: Jun. 17, 2014

(54) IMAGE PROCESSING DEVICE FOR MATCHING IMAGES OF A SAME PORTION OF A BODY OBTAINED BY MAGNETIC RESONANCE AND ULTRASOUNDS

(75) Inventors: Pierrick Coupe, Rennes (FR); Christian Barillot, Laille (FR); Xavier Morandi, Rennes (FR); Pierre Hellier, Thorigne Fouillard (FR)

(73) Assignee: Inria Institut National de Recherche en Informatique et en Automatique, Le Chesnay (FR)

( * ) Notice: Subject to any disclaimer, the term of this patent is extended or adjusted under 35 U.S.C. 154(b) by 1162 days.

(21) Appl. No.: 12/594,572

(22) PCT Filed: Mar. 25, 2008

(86) PCT No.: PCT/FR2008/000394
§ 371 (c)(1),
(2), (4) Date: Nov. 18, 2009

(87) PCT Pub. No.: WO2008/135668
PCT Pub. Date: Nov. 13, 2008

(65) Prior Publication Data
US 2010/0119135 A1    May 13, 2010

(30) Foreign Application Priority Data
Apr. 2, 2007 (FR) ..................................... 07 02386

(51) Int. Cl.
*G06K 9/00* (2006.01)
(52) U.S. Cl.
USPC .......................................... 382/131; 382/276
(58) Field of Classification Search
USPC ........... 324/306–309; 382/131, 132, 276, 294
See application file for complete search history.

(56) References Cited

U.S. PATENT DOCUMENTS 5,568,384 A * 10/1996 Robb et al. ..................... 715/202
5,633,951 A * 5/1997 Moshfeghi ..................... 382/154
(Continued)

FOREIGN PATENT DOCUMENTS

WO    WO 2006/092594 A2    9/2006

OTHER PUBLICATIONS

International Search Report, Dated Mar. 26, 2009, Corresponding to PCT/FR2008/000394.

(Continued)

*Primary Examiner* — Glen Kao
(74) *Attorney, Agent, or Firm* — Christie, Parker & Hale, LLP

(57) ABSTRACT

A device for processing of data including images of a portion of a body includes processing means capable of processing first data representative of elementary portions of an image obtained by magnetic resonance in a region of the body and second data representative of elementary portions of images obtained by ultrasounds in a portion of that region, by performing: i) generating first and second maps of the probability that the elementary portions belong to structures of interest of the portion of the region based at least on the intensities associated thereto and respectively defined by the first and second data; ii) estimating a conversion for shifting from one of the first and second maps to the other while maximizing for each of their elementary portion the joined probability that it belongs to a same structure of interest; and iii) resetting the structures of interest of one of the first and second maps relative to those of the other by the conversion.

13 Claims, 1 Drawing Sheet

(56) References Cited

U.S. PATENT DOCUMENTS

| | | | |
|---|---|---|---|
| 5,937,083 A * | 8/1999 | Ostuni | 382/131 |
| 6,266,453 B1 * | 7/2001 | Hibbard et al. | 382/294 |
| 6,728,424 B1 * | 4/2004 | Zhu et al. | 382/294 |
| 2002/0128550 A1 * | 9/2002 | Van Den Brink et al. | 600/411 |
| 2003/0199748 A1 * | 10/2003 | Camus et al. | 600/407 |
| 2004/0059217 A1 * | 3/2004 | Kessman et al. | 600/424 |
| 2004/0071325 A1 * | 4/2004 | Declerck et al. | 382/128 |
| 2004/0267111 A1 * | 12/2004 | Feinberg | 600/411 |
| 2005/0152617 A1 * | 7/2005 | Roche et al. | 382/294 |
| 2006/0004278 A1 * | 1/2006 | Giger et al. | 600/408 |
| 2006/0165267 A1 * | 7/2006 | Wyman et al. | 382/128 |
| 2007/0083117 A1 * | 4/2007 | Sakas et al. | 600/437 |
| 2007/0086678 A1 * | 4/2007 | Chefd'hotel et al. | 382/294 |
| 2009/0304252 A1 * | 12/2009 | Hyun et al. | 382/131 |

OTHER PUBLICATIONS

Maintz, et al., "Evaluation of Ridge Seeking Operators for Multimodality Medical Image Matching," IEEE Transations on Pattern Analysis and Machine Intelligence, vol. 18, No. 4, Apr. 1996, pp. 353-365, XP002157721.

* cited by examiner

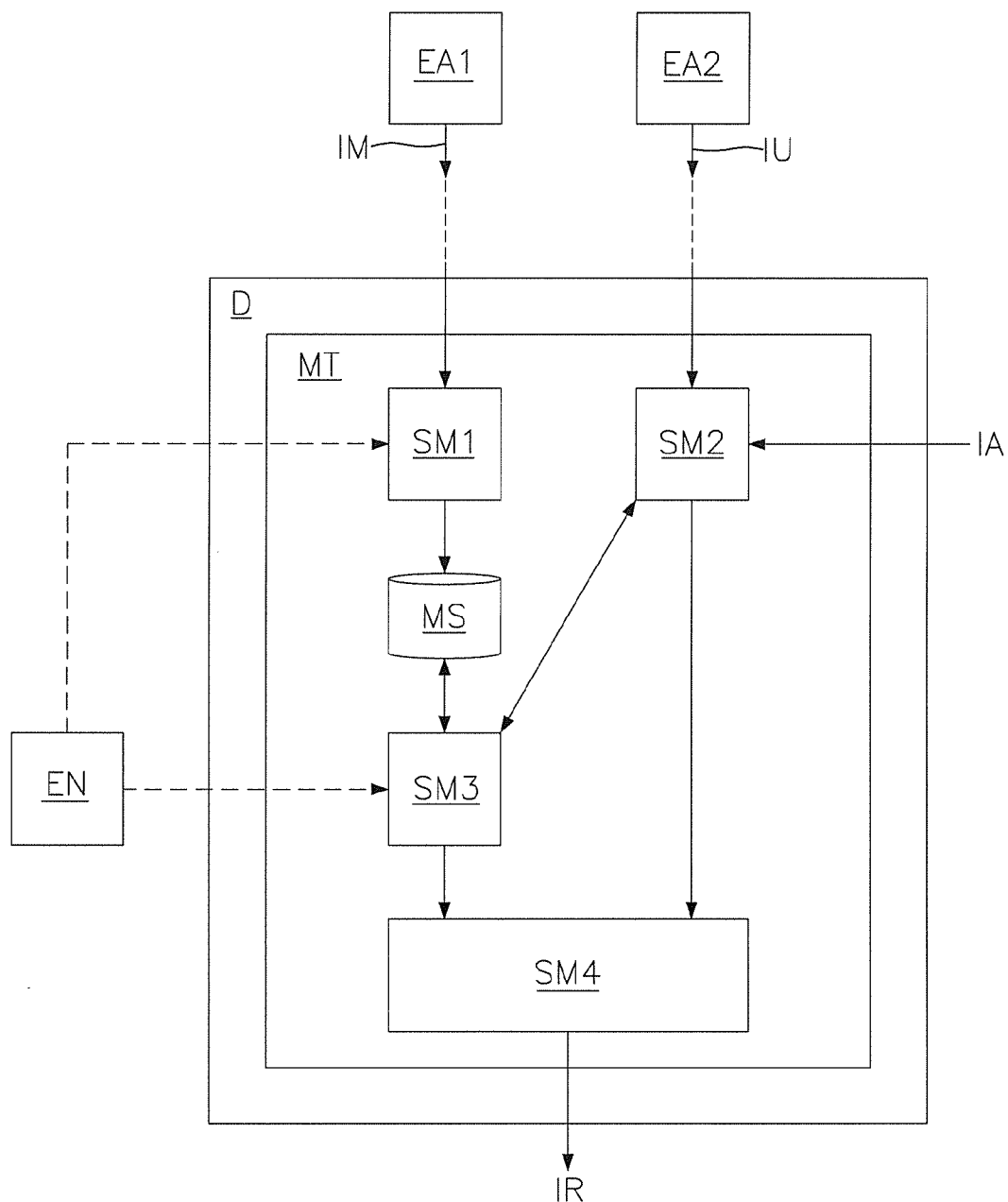

IMAGE PROCESSING DEVICE FOR MATCHING IMAGES OF A SAME PORTION OF A BODY OBTAINED BY MAGNETIC RESONANCE AND ULTRASOUNDS

CROSS-REFERENCE TO RELATED APPLICATION

This application is a National Phase Patent Application and claims the priority of International Application Number PCT/FR2008/000394, filed on Mar. 25, 2008, which claims priority of French Patent Application Number 0702386, filed on Apr. 2, 2007.

BACKGROUND OF THE INVENTION

The invention relates to devices for processing images of a portion or portions of a body, and more precisely devices for automatically registering pairs of two-dimensional (2D) or three-dimensional (3D) images of the same portion of a body, obtained by magnetic resonance and by ultrasound, respectively.

The invention relates to devices for processing images of a portion or portions of a body, and more precisely devices for automatically registering pairs of two-dimensional (2D) or three-dimensional (3D) images of the same portion of a body, obtained by magnetic resonance and by ultrasound, respectively.

By a "portion of a body" is meant here any part of a human or animal body consisting of tissues and/or organs that can be observed at least partially by means of magnetic resonance techniques and ultrasound techniques (B-mode echography).

In some fields, such as medicine, for example, magnetic resonance images or ultrasound images are used to make diagnoses on portions of a body, or even to carry out assisted surgery. The more precise the surgical interventions have to be (taking into account the operating environment), the more reliable and precise the images used have to be. This is the case particularly, although not restrictively, in the field of neurosurgery on the brain.

As the two methods of acquiring images mentioned above each supply specific data (reflection level for ultrasound and water concentration for magnetic resonance), it is therefore important to try to register with one another (or match) the images that they supply so that they can be superimposed precisely and thus provide reliable and complementary data for certain structures of interest.

Unfortunately, as those skilled in the art will know, the registration of such images is made particularly difficult by the fact that the two techniques for image acquisition supply information that is represented in very different ways (on account of the physics of image formation) and produce artefacts that are different in nature and origin (such as for example acoustic shadows (obscuring part of the signal) or speckle noise). Moreover, this registration rapidly becomes unstable.

Several conventional registration methods have been proposed, but none of them is truly effective and/or useable in real time, particularly in the field of image-assisted neurosurgical operations. This is the case particularly with the techniques known as "sum squared difference", "mutual information" and "correlation ratio".

It has also been proposed to improve some of the above-mentioned registration methods either by carrying out prior registration of features of homologous images extracted from the images, or by pre-treating the images so as to render them more similar and thus make it possible to use conventional measurements of similarity, or by carrying out so-called "iconic" registration based on a specific measure of similarity intended to tune the intensities of the images.

The pre-treatment of the images is based on the definition of regions of interest in the images by magnetic resonance and ultrasound, using dots, lines and/or areas. The main drawback of this pre-treatment is the fact that it renders the registration very sensitive to the (manual) segmentation of the images.

Iconic registration is based on the use of measurements of similarity based on image intensity. It eliminates the main drawback of image pre-treatment but involves searching for measurements of similarity starting from statistical measurements on histograms, which may lack specificity and result in a failure of registration.

As there is no satisfactory known technique for registering images by magnetic resonance and ultrasound, the invention therefore sets out to improve the situation.

SUMMARY

It proposes to this end a device dedicated to the processing of data that constitute images of a portion or portions of a body, and comprising processing means which are tasked, in the presence of first data representative of elementary parts of an image or images obtained by magnetic resonance in a region of a body and second data representative of elementary parts of an image or images obtained by ultrasound in a portion of this region, with:

constructing first and second maps of the probability of the elementary parts belonging to structures of interest in the portion of the region, as a function of at least the intensities associated therewith and defined by the first and second data, respectively, estimating a transformation which makes it possible to move from one of the first and second maps to the other, while maximising, for each of their elementary parts, the joint probability that it belongs to the same structure of interest, and registering the structures of interest of one of the first and second maps relative to those of the other by means of this transformation.

It proposes to this end a device dedicated to the processing of data that constitute images of a portion or portions of a body, and comprising processing means which are tasked, in the presence of first data representative of elementary parts of an image or images obtained by magnetic resonance in a region of a body and second data representative of elementary parts of an image or images obtained by ultrasound in a portion of this region, with:

constructing first and second maps of the probability of the elementary parts belonging to structures of interest in the portion of the region, as a function of at least the intensities associated therewith and defined by the first and second data, respectively, estimating a transformation which makes it possible to move from one of the first and second maps to the other, while maximising, for each of their elementary parts, the joint probability that it belongs to the same structure of interest, and registering the structures of interest of one of the first and second maps relative to those of the other by means of this transformation.

The processing device according to the invention may have other features which may be taken separately or in combination, notably:

its processing means may be tasked with maximising, for each elementary part, a joint probability which is a function of the product of the probability that it belongs to a structure of interest of the magnetic resonance image(s) by the product of the probability that it belongs to a structure of interest of the corresponding ultrasound image(s);

in the presence of two-dimensional (2D) ultrasound images, its processing means may be tasked with constructing the second map, by forming the first data which define a three-dimensional (3D) ultrasound image from the first data defining the two-dimensional ultrasound images, then transforming the intensity of each elementary part of this three-dimensional ultrasound image into a probability of being part of a structure of interest of between 0 and 1;

its processing means may be tasked with determining, for each elementary part of the second map, the probability of belonging to a structure of interest equal to the ratio between its intensity and $2^n$, where n is equal to the number of bits of the ultrasound image(s);

in the presence of a three-dimensional (3D) magnetic resonance image representing a region including the portion represented by the second data, its processing means may be tasked with constructing a first intermediate map, while determining for each elementary part of this three-dimensional magnetic resonance image a local mean curvature of the intensity value, then constructing the first map from the local mean curvatures of the first intermediate map and auxiliary data relating to the region of the body;

its processing means may be tasked with extracting from the first intermediate map the part that corresponds to the portion of the region that is represented by the second map, as a function of positional data obtained by means of navigation equipment;

this probability of belonging to a structure of interest may for example be equal either to the ratio between the local mean curvature of an elementary part of the first intermediate map and $2^n$ if it belongs to a healthy zone and if the local mean curvature is positive, n being equal to the number of bits in the three-dimensional magnetic resonance image, or to a parameter constituting auxiliary data assigned to the corresponding elementary part of the three-dimensional magnetic resonance image, subsequent to the determination of the positional data, if it belongs to a pathological zone, or to zero in every other case;

its processing means may be tasked with maximising the joint probability by means of an optimising function that does not involve calculation of the partial derivatives of the objective alignment function (joint probability);

its processing means may be tasked with estimating a rigid or non-rigid registration transformation;

its processing means may be tasked with constructing the first and second maps of the probability of belonging to so-called hyper-echogenic or hypo-echogenic structures of interest.

The invention is particularly well suited, although not in a restrictive manner, to the processing of images of a portion or portions of a body which is to be subjected to image-assisted neurosurgical operations.

Further features and advantages of the invention will become apparent from the detailed description that follows, and from the attached drawing, in which the single FIGURE shows in a highly schematic and functional manner an embodiment of a processing device according to the invention. The attached drawing may not only serve to complete the invention but in some cases may also contribute to its definition.

The invention sets out to allow precise registration (possibly in real time) of images of a portion of a body, obtained by magnetic resonance and ultrasound.

In the following description, it will be assumed, as a non-restrictive example, that the body portion is a portion of the brain. However, the invention is not limited to this type of body portion. In fact, it relates to any part of a human or animal body made up of tissues and/or organs that can be observed at least partly using magnetic resonance techniques and ultrasound techniques (B-mode echography).

Moreover, in the following description, it will be assumed, as a non-restrictive example, that the image processing is intended to assist a surgeon during a neurosurgical operation assisted by images that are registered in real time.

As shown schematically and functionally in the single FIGURE, a processing device D according to the invention comprises a processing module MT tasked with providing at least the three functions mentioned below, each time it has first data that are representative of elementary parts of an image or images obtained by magnetic resonance in a region of a body (in this case a brain) and second data that are representative of elementary parts of an image or images obtained by ultrasound in a portion of this same region.

It should be pointed out that the magnetic resonance image (s) (first data) are normally volumetric (3D), whereas the ultrasound images (second data) are most often two-dimensional (2D) but may undergo 3D reconstruction. However, it might be envisaged that the magnetic resonance images, and also the ultrasound images, are all of the same type, i.e. 2D or 3D.

Moreover, it is pointed out that the elementary part of a 2D image is normally referred to as a "pixel", whereas the elementary part of a 3D image is normally referred to as a "voxel".

When a region of a body is represented by a 3D-type magnetic resonance image, generally one to several dozen 2D-type ultrasound images are needed to represent a 3D portion of this same region.

Each 3D magnetic resonance image (IM) is acquired by means of a first acquisition apparatus EA1 of the MRI type (Magnetic Resonance Imager). Each 2D ultrasound image (IU) is acquired by means of a second acquisition apparatus EA2 of the echography apparatus type (possibly a Doppler type apparatus).

In the case of a surgical operation (or intervention), the acquisition of image(s) by 3D magnetic resonance (IM) takes place before the said operation, whereas the acquisition of 2D ultrasound images (IU) takes place during the said operation. These images are then used to enable the surgeon to observe precisely on a screen the portion of region which is being operated on and to move around therein in order to carry out interventions, which are generally planned in advance during a so-called pre-operative phase carried out using navigation equipment EN.

It should be pointed out that, to make it possible to set up a link between a patient in the operating theatre and the pre-operative images of this same patient, a rigid geometric transformation is calculated using three-dimensional (3D) locating systems. These 3D locating systems, chiefly based on optical technology, detect and locate, in a 3D marker linked to the patient and in real time, the position of light-emitting diodes fixed to the surgical instruments and to the operating microscope. Thus, it is possible to merge the pre-operative images of the patient with the view of the surgeon's operating field.

The primary function of the processing module MT is to construct first and second maps showing the probability of the elementary parts belonging to structures of interest that are contained in the portion of a region, as a function at least of the intensities associated therewith and defined by the first (IM) and second (IU) data, respectively.

BRIEF DESCRIPTION OF THE DRAWINGS

Further features and advantages of the invention will become apparent from the detailed description that follows, and from the attached drawing, in which the single FIG. 1 shows in a highly schematic and functional manner an embodiment of a processing device according to the invention. The attached drawing may not only serve to complete the invention but in some cases may also contribute to its definition.

When the magnetic resonance image IM is of the 3D type and is obtained before the operation, the processing module MT processes, preferably virtually immediately, the first data that make it up, in order to build a first map known as the intermediate map. To do this, it determines, for each elementary part (in this case a voxel X(x,y,z)) of the 3D magnetic resonance image IM, a local mean curvature of the value of the intensity V(X) associated therewith (defined by a first data item).

DETAILED DESCRIPTION

The invention sets out to allow precise registration (possibly in real time) of images of a portion of a body, obtained by magnetic resonance and ultrasound.

Preferably, each mean curvature of a voxel X is given by the value of an operator known as MIvv well known to the skilled man and defined (in the case of 3D) by equation (1) in the Appendix, wherein V(X) denotes the value of the intensity associated with the voxel X(x,y,z) of the 3D magnetic resonance image IM, a denotes a partial derivative operator and $\|w\|^2$ is defined by equation (2) in the Appendix.

It should be mentioned that this operator MIvv was introduced in order to detect the sulci in the cerebral cortex and the falx cerebri, in the document by G. Le Goualher et al, "Three-dimensional segmentation and representation of cortical sulci using active ribbons", Int. J. of Pattern Recognition and Artificial Intelligence, vol. 11; no. 8, pp. 1295-1315, 1997. Of course, other operators that make it possible to obtain a map of probability intensities from intensity data may be used, such as for example mean curvatures, Gaussian curvatures and indices of curvature.

All the local mean curvatures MIvv of the intensity values associated with the voxels of the 3D magnetic resonance image (IM) together constitute a first intermediate map of (probability) intensities of structures of interest. This first map is said to be intermediate because, on the one hand, it generally represents a region of a body and not a portion of a region of a body, as is the case with ultrasound images IU, and on the other hand it is not yet made up of probabilities of belonging to structures of interest.

As shown schematically and functionally in the single FIG. 1, a processing device D according to the invention comprises a processing module MT tasked with providing at least the three functions mentioned below, each time it has first data that are representative of elementary parts of an image or images obtained by magnetic resonance in a region of a body (in this case a brain) and second data that are representative of elementary parts of an image or images obtained by ultrasound in a portion of this same region.

It is important to note that the type of structures of interest may be either hyper-echogenic or hypo-echogenic. By "hyper-echogenic structure" is meant here a structure of a region of a body the intensity of which is very high (tending towards the white), and by "hypo-echogenic structure" is meant a structure of a region of a body the intensity of which is very low (tending towards the black). Consequently, a very high local mean curvature (MIvv) corresponds to a convex anatomical shape, whereas a very low local mean curvature MIvv corresponds to a concave anatomical shape.

For example, and as shown, the processing module MT may comprise a first sub-module SM1 tasked with constructing each first intermediate map from the first data which define a 3D magnetic resonance image (IM).

The processing module MT may also comprise, as shown, storage means MS in which its first sub-module SM1 stores each first intermediate map so that it can be used later for registration of any ultrasound images IU obtained during a surgical operation. These storage means MS may take any form, such as a memory, for example (possibly a logic memory). It should be noted that, in an alternative embodiment, the storage means MS may be outside the processing module MT, or even on the apparatus D.

When the ultrasound images IU are of the 2D type and are obtained during the operation, the processing module MT has to process them "on the fly". More precisely, it receives them from the echography apparatus EA2 and starts by constructing a 3D ultrasound image from the first data that define a group of 2D ultrasound images. At this stage, the intensities associated with each of the voxels of the 3D ultrasound image are generally contained within the range of values [0, 255]. Consequently, in order to construct a second probability map, the processing module MT has to transform the intensity of each voxel of this 3D ultrasound image into a probability of forming part of a structure of interest of between 0 and 1. This transformation constitutes a standardisation.

It is important to note that the type of structures of interest of a second map is selected to be identical to that of the corresponding first map (possibly an intermediate map) (stored in the memory MS). Consequently, the structures of interest of a second map are either hyper-echogenic when they correspond to voxels with a probability of approximately one (1), or hypo-echogenic when they correspond to voxels with a probability of approximately zero (0).

In the following description, the structures of interest will be assumed to be hyper-echogenic, by way of illustrative and non-restrictive example.

For example, and as shown, the processing module MT may have a second sub-module SM2 tasked with constructing each second map from the second data that define a set of 2D ultrasound images (IU).

The second function of the processing module MT is to estimate a registration transformation TR which makes it possible to go from one of the first and second maps (which correspond to the same portion of region) to the other while maximising for each of their elementary parts (in this case the voxels X(x,y,z)) the joint probability that it belongs to the same structure of interest.

Usually, the objective is to align the second map (ultrasound) relative to the corresponding first map (magnetic resonance).

When there is a first intermediate map (magnetic resonance) and a transition has to be made from a second map to a first map, the processing module MT has to extract from this first intermediate map the data that constitute the part corresponding to the portion of region which is represented by the second map (ultrasound), and produce the first map with these extracted data. To do this, it is supplied for example with positional data obtained beforehand using the navigation equipment EN.

These positional data are generally landmarks which have been associated by the surgeon (or an operator), during a pre-operative navigation phase using the navigation equipment EN, with characteristic structures appearing in the 3D magnetic resonance image.

Thanks to these positional data it is possible to produce, from a first intermediate map, a first map essentially showing the portion of the region represented by the second map. To do this, it is possible for example to use geometric landmark dots after having carried out optimisation of the transformation by the least squares method.

For example, and as shown, the processing module MT may comprise a third sub-module SM3 tasked with constructing each first map from an first intermediate map (optionally stored in the memory MS), positional data and the corresponding second map.

The registration transformation TR to be determined may be either rigid or non-rigid.

For example, it is possible to use the rigid or non-rigid registration transformation TR given by equation (3) in the appendix, wherein $p(X \delta \Phi_{IU}, T(X) \delta \Phi_{IM})$ is the joint probability that the voxel $X(x,y,z)$ belongs to the same structure of interest in the first and second maps, $T(X)$ denotes the voxel $X(x,y,z)$ in the first map (originating from the first intermediate map and hence from the 3D magnetic resonance image), $\Phi_{IU}$ denotes the portion of region represented by the second map, and $\Phi_{IM}$ denotes the portion of region represented by the first map.

The probability that the voxel $X(x,y,z)$ belongs to a structure of interest in the second map being independent of the probability that the voxel $T(X)$ belongs to a structure of interest in the first map, then the joint probability $p(X\epsilon \Phi_{IU}, T(X)\epsilon \Phi_{IM})$ may be rewritten as indicated by equation (4) in the appendix, where $p_{IU}(X\epsilon \Phi_{IU})$ is the probability that the voxel $X(x,y,z)$ belongs to a structure of interest in the second map and $p_{IM}(T(X)\epsilon \Phi_{IM})$ is the probability that the voxel $T(X)$ belongs to a structure of interest in the first map.

Consequently, the expression of the transformation TR (given by equation (3) in the appendix) may be rewritten as indicated by equation (5) in the appendix.

In order to maximise this transformation TR, the processing module MT must therefore have access to the probability $p_{IU}(X\epsilon \Phi_{IU})$ associated with each voxel in the second map and the probability $p_{IM}(T(X)\epsilon \Phi_{IM})$ associated with each voxel of the corresponding first map.

The determination of the probabilities $p_{IU}(X\epsilon \Phi_{IU})$ that the voxels X belong to structures of interest in the second map (and hence in the 3D ultrasound image) may for example be carried out by the second sub-module SM2. To do this, the probability that a voxel X of the 3D ultrasound image belongs to a structure of interest may for example be chosen to be equal to the ratio between its intensity and where n is equal to the number of bits of the 3D ultrasound image in order to re-calibrate the intensities in the interval [0,1], i.e.:

$$p_{IU}(X\epsilon\Phi_{IU})=U(X)/2^n.$$

where $U(X)$ denotes the intensity of the voxel $X(x,y,z)$ of the 3D ultrasound image.

Moreover, the determination of the probabilities $p_{IM}(T(X)\epsilon\Phi_{IM})$ that the voxels $T(X)$ belong to structures of interest in the 3D ultrasound image may for example be carried out by the third sub-module SM3. To do this, the probability that a voxel X of the first intermediate map belongs to a structure of interest of the 3D magnetic resonance image may for example be chosen as a function of the value of its local mean curvature and auxiliary information IA relating to the portion of the region of the body in question.

This auxiliary information IA is determined for example by the surgeon (or operator) in a pre-operative phase, for example the phase (known as manual segmentation) which is carried out using the navigation equipment EN. It constitutes, for example, a priori data ($\Psi(X)$) relating to the characteristic pathological structures M2 contained in the region in question. For example, a high value of $\Psi(X)$ (close to 1) may be assigned to each voxel of a hyper-echogenic structure such as a cavernoma or low grade glioma, and a low value of $\Psi(X)$ (close to 0) may be assigned to each voxel of a hypo-echogenic structure such as a necrosis or a cyst.

For example, if a hyper-echogenic structure is deemed to be homogeneous, a value $\Psi(X)$ equal to 1 may be assigned to each voxel X which represents it. Similarly, if a hypo-echogenic structure is deemed to be homogeneous, a value $\Psi(X)$ equal to 0 may be assigned to each voxel X which represents it.

As a non-restrictive example, the probability that a voxel X of the first map belongs to a structure of interest may be defined by the equations (6) in the appendix, where M1 denotes a non-pathogenic characteristic structure wherein each value of MIvv corresponds to a negative mean curvature, and n is equal to the number of bits of the 3D magnetic resonance image (and hence of the first intermediate map).

This comes down to determining the local mean curvatures MIvv of a region by masking the pathological zones M2, then conserving only the positive values of the MIvv and finally adding the auxiliary information ($\Psi(X)$ or IA) relating to the pathological zones M2. Consequently, the probabilities $p_{IM}(X\epsilon\Phi'_{IM})$ that the voxels X belong to structures of interest of the 3D magnetic resonance image (and hence of the first intermediate map) may optionally be determined in advance, for example by the first sub-module SM1, from said first intermediate map (and more precisely the values of the local mean curvatures) and auxiliary information IA (or $\Psi(X)$) relating to the portion of the region of the body in question. These probabilities $p_{IM}(X\epsilon \Phi'_{IM})$ (where $\Phi'_{IM}$ denotes the region of the body represented by the 3D magnetic resonance image) thus constitute a first intermediate probability map which may be stored in the memory MS by the first sub-module SM1.

In this case, when the processing module MT requires a first map corresponding to a second map, it has first of all to access the memory MS in order to retrieve the corresponding first intermediate map. Then it constructs the first map from this first intermediate map, the positional data (optionally supplied by the navigation equipment EN), and the portion of region that is represented by the second map in question.

Once the processing module MT has access to the first and second probability maps, it is then capable of maximising the registration transformation TR (function of the joint probability). Any method known to the skilled man may be used for this purpose. As a non-restrictive example, it is possible for example to use an optimising function which does not involve calculating the partial derivatives of the objective matching function (such as the one known as "simplex with a multi-resolution diagram") or a "Powell"-type optimising function.

It will be recalled that the simplex optimising function, well known to those skilled in the art, makes it possible to estimate the optimum parameters that maximise or minimise an objective function. It is based on an iterative linear programming algorithm which, in the present case, makes it possible to estimate the parameters of the 3D transformation TR (six, in the rigid case) which maximise the joint probability defined in equation (4).

Then, once the registration transformation TR has been maximised, the processing module MT uses its third function. This latter consists in registering the structures of interest in one of the first and second maps relative to those in the other one, by means of the maximised registration transformation TR. As mentioned previously, the second map (ultrasound) is generally registered relative to the first map (magnetic resonance) (although the reverse is also possible), in order to deliver a registered image IR that can be used by the surgeon (or an operator).

For example, and as shown, the processing module MT may comprise a fourth sub-module SM4 tasked with maximising the registration transformation TR and proceeding with the image registration using the latter.

The processing device D is preferably produced in the form of software modules. However, it may also take the form of electronic circuits (or hardware), or a combination of circuits and software.

The invention is not limited to the embodiments of processing devices described hereinbefore, purely by way of example, but encompasses all the variants that might be envisaged by the skilled man within the scope of the claims that follow.

ii) estimate a transformation which makes it possible to move from one of said first and second maps to the other, while maximising, for each of the elementary parts, a joint probability that said each elementary part belongs to the same structure of interest, and iii) register the structures of interest of one of the first and second maps relative to the structures of interest of the other map, by said transformation.

2. The device according to claim 1, wherein said processing means are arranged to maximise, for each elementary part, a joint probability which is a function of the product of the probability that said each elementary part belongs to a structure of interest of the magnetic resonance image(s) by the product of the probability that said each elementary part belongs to a structure of interest of the corresponding ultrasound image(s).

3. The device according to claim 2, wherein in the presence of two-dimensional ultrasound images, said processing means re arranged to construct said second map by constituting second data which define a three-dimensional ultrasound image from the second data defining said two-dimensional ultrasound images, then transforming the intensity of each elementary part of said three-dimensional ultrasound image into a probability of being part of a structure of interest between 0 and 1, and, wherein said processing means are further arranged to determine, for each elementary part of

APPENDIX $$Mlvv(V(X)) = -\frac{1}{2\|w\|^2}\begin{bmatrix} \frac{\partial V(X)^2}{\partial x}\left(\frac{\partial^2 V(X)}{\partial y^2} + \frac{\partial^2 V(X)}{\partial z^2}\right) - 2\frac{\partial V(X)}{\partial y}\frac{\partial V(X)}{\partial z}\frac{\partial^2 V(X)}{\partial y \partial z} + \\ \frac{\partial V(X)^2}{\partial y}\left(\frac{\partial^2 V(X)}{\partial x^2} + \frac{\partial^2 V(X)}{\partial z^2}\right) - 2\frac{\partial V(X)}{\partial x}\frac{\partial V(X)}{\partial z}\frac{\partial^2 V(X)}{\partial x \partial z} + \\ \frac{\partial V(X)^2}{\partial z}\left(\frac{\partial^2 V(X)}{\partial x^2} + \frac{\partial^2 V(X)}{\partial y^2}\right) - 2\frac{\partial V(X)}{\partial x}\frac{\partial V(X)}{\partial y}\frac{\partial^2 V(X)}{\partial x \partial y} + \end{bmatrix} \quad (1)$$

$$\|w\|^2 = \left[\frac{\partial V(X)^2}{\partial x} + \frac{\partial V(X)^2}{\partial y} + \frac{\partial V(X)^2}{\partial z}\right] \quad (2)$$

$$TR = \underset{T}{\operatorname{argmax}} \int_{\Omega} p(X \in \Phi_{IU}, T(X) \in \Phi_{IM}) dX \quad (3)$$

$$p(X \in \Phi_{IU}, T(X) \in \Phi_{IM}) = p_{IU}(X \in \Phi_{IU}) \cdot p_{IM}(T(X) \in \Phi_{IM}) \quad (4)$$

$$TR = \underset{T}{\operatorname{argmax}} \int_{\Omega} p_{IU}(X \in \Phi_{IU}) \cdot p_{IM}(T(X) \in \Phi_{IM}) dX \quad (5)$$

$$p_{IM}(T(X) \in \Phi_{IM}) = \begin{cases} \frac{Mlvv(V(X))}{2^n} & \text{if } X \in M1 \\ \Psi(X) & \text{if } X \in M2 \\ 0 & \text{in all other cases} \end{cases} \quad (6)$$

The invention claimed is:

1. A device for processing data that constitute images of a portion or portions of a body comprising:
   processing means for processing first data representative of elementary parts of an image or images obtained by magnetic resonance in a region of a body and second data representative of elementary parts of an image or images obtained by ultrasound in a portion of said region, said processing means configured to
   i) construct first and second maps of a probability of the elementary parts belonging to structures of interest in said portion of the region, as a function of at least intensities associated therewith and defined by the first and second data, respectively, said second map, a probability of belonging to a structure of interest equal to the ratio between an intensity of said each elementary part and $2^n$, where n is equal to the number of bits of the ultrasound image(s).

4. The device according to claim 1, wherein in the presence of two-dimensional ultrasound images, said processing means are arranged to construct said second map by constituting second data which define a three-dimensional ultrasound image from the second data defining said two-dimensional ultrasound images, then transforming the intensity of each elementary part of said three-dimensional ultrasound image into a probability of being part of a structure of interest between 0 and 1.

5. The device according to claim 1, wherein in the presence of a three-dimensional magnetic resonance image representing a region including the portion represented by said second data, said processing means are arranged to construct a first intermediate map, while determining for each elementary part of said three-dimensional magnetic resonance image a local mean curvature of an intensity value, then constructing said first map from the local mean curvatures of said first intermediate map and auxiliary data relating to said region of the body.

6. The device according to claim 5, wherein said processing means are arranged so as to extract from said first intermediate map the part that corresponds to the portion of region that is represented by said second map, as a function of positional data obtained by means of navigation equipment.

7. The device according to claim 5, wherein said probability of belonging to a structure of interest is equal to a ratio between the local mean curvature of an elementary part of said first intermediate map and $2^n$, if it belongs to a healthy zone and if the local mean curvature is positive, n being equal to the number of bits in the three-dimensional magnetic resonance image, or to a parameter constituting auxiliary data attributed to the corresponding elementary part of the three-dimensional magnetic resonance image, subsequent to the determination of the positional data, if it belongs to a pathological zone, or to zero in every other case.

8. The device according to claim 1, wherein said processing means are arranged so as to maximise the joint probability by means of an optimising function that does not involve calculation of the partial derivatives of the objective matching function.

9. The device according to claim 1, wherein said processing means are arranged to estimate a rigid registration transformation.

10. The device according to claim 1, wherein said processing means are arranged to estimate a non-rigid registration transformation.

11. The device according to claim 1, wherein said processing means are arranged to construct first and second maps of a probability of belonging to a hyper-echo genic structures of interest.

12. The device according to claim 1, wherein said processing means are arranged to construct first and second maps of a probability of belonging to a hypo-echo genic structures of interest.

13. The device according to claim 1, being used for processing images of body and for being subjected to image assisted neurosurgical operations.

* * * * *